(12) United States Patent
Huh

(10) Patent No.: US 11,608,065 B2
(45) Date of Patent: Mar. 21, 2023

(54) METHOD FOR ADVANCED INERTIA DRIVE CONTROL OF VEHICLE

(71) Applicants: Hyundai Motor Company, Seoul (KR); Kia Motors Corporation, Seoul (KR)

(72) Inventor: Jee-Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 547 days.

(21) Appl. No.: 16/213,396

(22) Filed: Dec. 7, 2018

(65) Prior Publication Data

US 2020/0062259 A1   Feb. 27, 2020

(30) Foreign Application Priority Data

Aug. 23, 2018   (KR) ........................ 10-2018-0098425

(51) Int. Cl.
| | | |
|---|---|---|
| *B60W 30/18* | (2012.01) | |
| *G08G 1/0967* | (2006.01) | |
| *B60W 20/00* | (2016.01) | |
| *B60K 6/20* | (2007.10) | |
| *B60L 15/00* | (2006.01) | |

(52) U.S. Cl.
CPC ............... B60W 30/18072 (2013.01); B60W 30/18163 (2013.01); *B60K 6/20* (2013.01); *B60L 15/00* (2013.01); *B60W 20/00* (2013.01); *B60W 2420/42* (2013.01); *B60W 2420/52* (2013.01); *B60W 2420/54* (2013.01); *B60W 2552/05* (2020.02); *B60W 2555/60* (2020.02); *B60W 2710/083* (2013.01); *B60W 2720/106* (2013.01); *B60Y 2200/91* (2013.01); *B60Y 2200/92* (2013.01); *G08G 1/096791* (2013.01)

(58) Field of Classification Search
None
See application file for complete search history.

(56) References Cited

U.S. PATENT DOCUMENTS

| | | | |
|---|---|---|---|
| 9,898,928 B1* | 2/2018 | Payne | .............. G08G 1/096741 |
| 2014/0172217 A1* | 6/2014 | Miyazaki | ............... B60K 6/445 |
| | | | 701/22 |
| 2014/0324305 A1* | 10/2014 | Larsson | ................. B60W 10/11 |
| | | | 701/54 |
| 2017/0015211 A1* | 1/2017 | Kim | ...................... B60W 10/06 |
| 2018/0043896 A1* | 2/2018 | Lee | ........................ B60W 10/06 |
| 2018/0201266 A1* | 7/2018 | Dodo | .............. B60W 30/18072 |

(Continued)

FOREIGN PATENT DOCUMENTS

| | | |
|---|---|---|
| JP | 2016-182934 A | 10/2016 |
| JP | 2016-215934 A | 12/2016 |
| JP | 2017-020460 A | 1/2017 |

(Continued)

*Primary Examiner* — David P. Merlino
(74) *Attorney, Agent, or Firm* — Fox Rothschild LLP

(57) ABSTRACT

A method for inertia drive control is provided. The method includes performing advanced inertia drive control by an inertia drive controller. The controller detects a speed reduction event during road driving of a vehicle, lane division together with road type division for a road, and performs inertia drive control guide and the inertia drive control based on drive conditions of lane change and lane maintenance.

15 Claims, 9 Drawing Sheets

(56) References Cited

U.S. PATENT DOCUMENTS

2019/0001984 A1* 1/2019 Huh ................. B60W 10/08
2019/0003835 A1* 1/2019 Jo ................. G01C 21/3629

FOREIGN PATENT DOCUMENTS

| JP | 2018122818 A | 8/2018 |
| KR | 10-2015-0006518 A | 1/2015 |
| KR | 10-2018-0069606 A | 6/2018 |
| KR | 20180068245 A | 6/2018 |
| KR | 20180069506 A | 6/2018 |
| WO | 5273259 A1 | 5/2013 |
| WO | 2016063383 A1 | 8/2017 |

* cited by examiner

METHOD FOR ADVANCED INERTIA DRIVE CONTROL OF VEHICLE

CROSS-REFERENCE TO RELATED APPLICATION

This application claims priority to Korean Patent Application No. 10-2018-0098425, filed on Aug. 23, 2018, which is incorporated herein by reference in its entirety.

BACKGROUND

Field of the Disclosure

The present disclosure relates to inertia drive control of a vehicle, and more particularly, to a vehicle in which advanced inertia drive control is implemented based on division of road types and lanes.

Description of the Related Art

Recently, inertia drive control introduced to an eco-friendly vehicle including a motor as a power source, such as a hybrid electric vehicle (HEV), a plug-in hybrid electric vehicle (PHEV), an electric vehicle (EV), a fuel cell electric vehicle (FCEV), and mild hybrid electric vehicle (MHEV), has been developed as autonomy-based technology as well as being actively used for fuel efficiency improvement by performing driving speed reduction even without driver's direct braking through heightening of vehicle autonomy.

As an example, the inertia drive control improves fuel efficiency while a vehicle is being driven compared to during regenerative braking by providing a notification to a driver regarding a forward speed reduction event occurrence (e.g., navigation information) determined by the vehicle to guide the speed reduction so that the driver disengages an acceleration pedal, and by performing speed reduction of the vehicle through motor control in which a brake pedal is not used to follow the speed reduction guide.

Accordingly, the inertia drive control improves the fuel economy improvement rate in association with the regenerative braking control, and has a high motor utility for the vehicle speed reduction control and a utility suitable to infra technology required by the autonomous vehicle through motor speed reduction control without driver's intervention.

However, the current inertia drive control simply performs speed reduction control only in accordance with a speed reduction event without division of the road types and the lanes, and thus requires the following improvement. As an example, an approach to a departure road in accordance with a lane change condition of an interchange (IC) or a junction (JC) should be improved to solve the difficulty of lane change caused by rear vehicle driving obstruction occurring due to self-vehicle speed reduction in a passing lane (e.g., dotted lane) and a slow vehicle speed against a lower-lane vehicle occurring due to self-vehicle speed reduction in a higher lane (e.g., first lane).

As another example, an approach to a passing road in accordance with a lane maintaining condition of a speed camera and a tollgate should be improved to solve the rear vehicle traffic inconvenience due to a high vehicle speed in a higher lane (e.g., first lane) compared to that in a lower lane, camera approach distance speed reduction in a higher lane (e.g., first lane) compared to that in a lower lane, and excessive speed reduction in a higher lane of an undivided road.

SUMMARY

Exemplary embodiments of the present disclosure overcome the above disadvantages and other disadvantages not described above, and provide a method for advanced inertia drive control of a vehicle, which extends an inertia drive control region to road type division of an expressway and a highway and more than 2-lane division, minimizes a drive obstruction influence exerted on surrounding vehicles around a self-vehicle particularly during IC/JC departure road approach driving and speed camera/tollgate passing driving, and performs the inertia drive control without exerting an unpleasant feeling to a driver through an excessive speed reduction or early control start.

Other objects and advantages of the present disclosure may be understood by the following description, and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, a method for inertia drive control may include performing advanced inertia drive control including detecting, by an inertia drive controller, a speed reduction event during road driving of a vehicle, lane division together with road type division for a road, and performing inertia drive control guide and the inertia drive control on drive conditions of lane change and lane maintenance.

Additionally, the lane change may be applied to departure approach driving of an interchange (IC) or a junction (JC), and the lane maintenance may be applied to speed camera or tollgate passing driving. The speed reduction event may be confirmed from navigation information or road information of a vehicle-to-vehicle (V2V) communication device.

The advanced inertia drive control may include determining a total number of lanes for the lane division by classifying an expressway or a highway in which the speed reduction event has occurred into the road type; determining a driving lane among the total number of lanes; and in case of a lane change speed reduction condition by the speed reduction event, switching to a lane change inertial drive control mode in which departure determination, departure start point determination, lane change point determination, lane change alarm display, departure start point arrival, rear vehicle condition determination, departure start point feed forward condition setting, departure switching point feedback condition setting, and departure inertial drive control are performed.

Additionally, in case of a lane maintenance speed reduction condition by the speed reduction event, the method may include switching to a lane maintenance inertia drive control mode in which passage object division, passage road start point determination, passage road start point feed forward condition setting, passage road switching point feedback condition setting, and passage road inertia drive control are performed. The method may further include determining departure arrival in the lane change inertia drive control mode and completion of object passage road advanced inertia drive control in the lane maintenance inertia drive control mode.

In the advanced inertia drive control, the lane division may be performed when the total number of lanes corresponds to a first lane, a second lane, a third lane, and an N-th lane (N is a constant that is equal to or larger than 4). The second lane may be applied as a reference lane in determining the driving lane. The departure determination may be performed by determining a departure position and a departure speed limit from the total number of lanes.

In particular, the departure start point determination may be performed by differently providing start point compensation factors to the departure start point confirmed from the total number of lanes, and the lane change point determination may be performed by confirming the lane change point arrival through the departure start point and calculation of the number of times of lane changes up to the departure road. The inertia drive guide for the departure start point becomes earlier or is delayed through application of the start point compensation factor, and the lane change point arrival is reduced or increased through application of the start point compensation factor.

Additionally, in the lane change inertia drive control mode, the rear vehicle condition determination may be performed by applying an initial inter-vehicle distance between a self-vehicle (e.g., subject vehicle) and a rear vehicle, a vehicle speed difference, and a final inter-vehicle distance. The initial inter-vehicle distance, the vehicle speed difference, and the final inter-vehicle distance apply threshold values for condition satisfaction, and the threshold values for the condition satisfaction delay the inertia drive guide.

In the lane change inertia drive control mode, the departure start point feed forward condition setting may be performed by applying an inertia drive motor torque obtained by adding an additional torque to a basic creep torque to a motor. The departure switching point feedback condition setting may be performed through vehicle speed control for reaching a target vehicle speed at a target point. The departure start point feed forward condition setting may be performed by applying a feed forward correction factor that either decreases or increases a feed forward value, and the departure switching point feedback condition setting may be performed by applying a feedback correction factor that either decreases or increases a feedback value.

Further, in the vehicle maintenance inertia drive control mode, the passage object division may be performed by applying a speed camera or a tollgate. The passage road start point feed forward condition setting may be performed by applying an inertia drive motor torque obtained by adding an additional torque to a basic creep torque to a motor, and the passage road switching point feedback condition setting may be performed through vehicle speed control for reaching a target vehicle speed at a target point.

The passage road start point feed forward condition setting may be performed by applying a feed forward correction factor that decreases or increases a feed forward value, and the passage road switching point feedback condition setting may be performed by applying a feedback correction factor that decreases or increases a feedback value. When the road type is a road having two lanes or less, the inertia drive control may be performed until the speed reduction event is released to follow the inertia drive guide.

In accordance with another exemplary embodiment of the present disclosure, a vehicle may include a vehicle-mounted device including a sensor composed of any one of a camera, a radar, a lidar, an ultrasonic sensor, and a vehicle speed sensor, and a navigation configured to provide a road limit vehicle speed, an interchange (IC), a junction (JC), a tollgate, and a speed camera as speed reduction events; and an inertia drive controller configured to perform road type and lane division with respect to a road at the speed reduction event detected during road driving, and to perform advanced inertia drive control to match a vehicle speed reduction control based on the speed reduction event to the interchange (IC), the junction (JC), the speed camera, and the tollgate, respectively.

The advanced inertia drive control may be divided into a lane change inertia drive control mode to match a lane change for approaching a departure road of the interchange (IC) or the junction (JC) and a lane maintenance inertia drive control mode to match lane maintenance for a passage of the speed camera and the tollgate. The vehicle-mounted device may include a vehicle-to-vehicle (V2V) communication device configured to provide information environments of the vehicle and the road.

The vehicle according to the present disclosure performs the advanced inertia drive control, and thus implements the following operations and effects.

First, the fuel economy effect may be improved compared to the existing inertia drive guide region through the region extension of the inertia drive guide function.

Second, the control accuracy may be secured since more accurate control becomes possible through the divided control for each lane to solve the drawback that the use of the inertia drive guide function may be avoided due to rear vehicle drive obstruction in accordance with the inertial drive guide performing in the existing inertia drive guide region, and thus an environment in which a driver may use the inertia drive guide function more actively may be made.

Third, the merchantability improvement effect may be obtained since the inertia drive guide function may be performed more safely when the rear vehicle exists, and more active control becomes possible to achieve smart image establishment.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
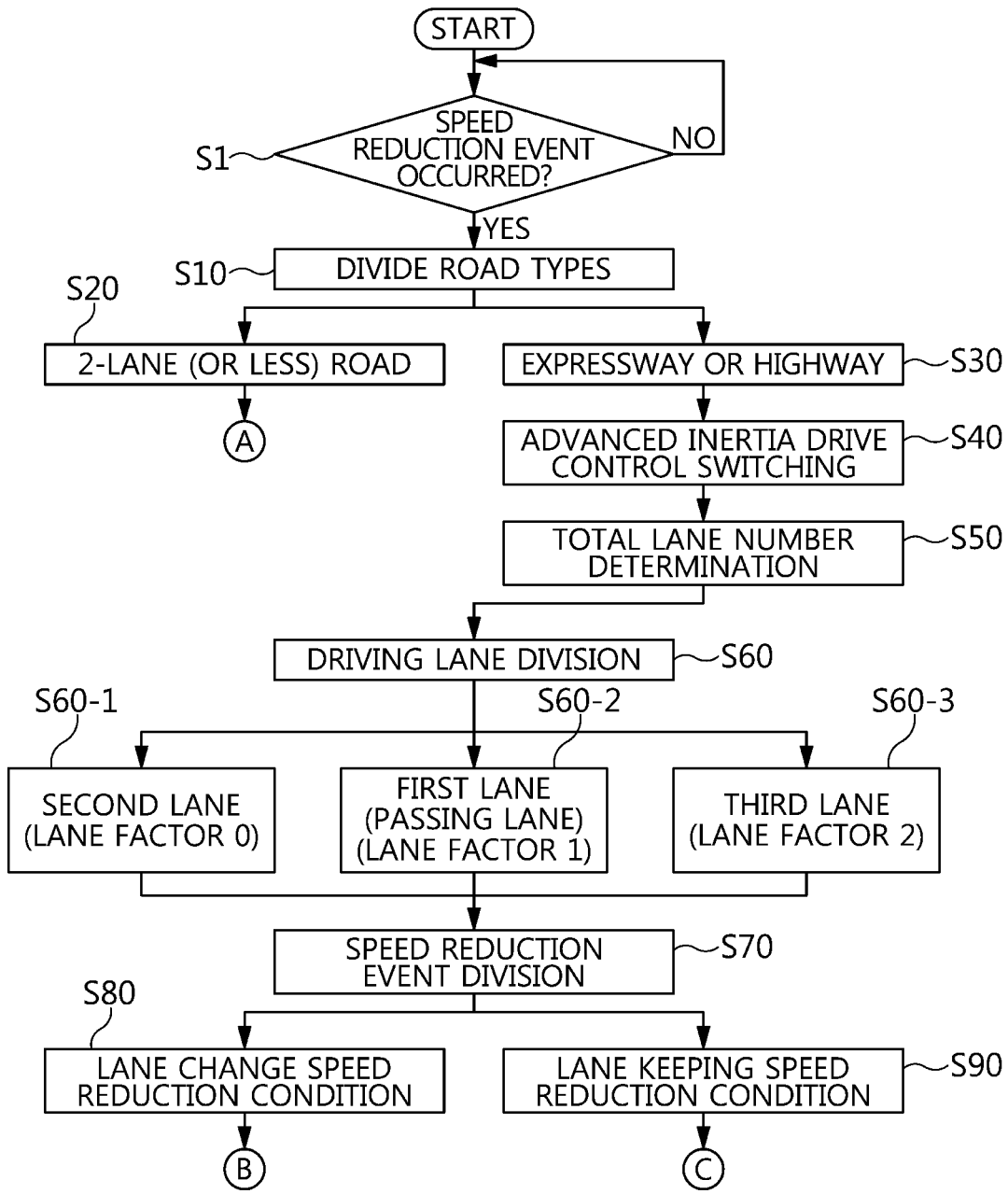
FIG. 1 is a flowchart illustrating a method for advanced inertia drive control according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present disclosure will be described in detail with reference to the accompanying exemplary drawings. However, since such an embodiment is exemplary and may be implemented in various different types by those of ordinary skill in the art to which the present disclosure pertains, the present disclosure is not limited to the exemplary embodiment described hereinafter.

Figure 2:
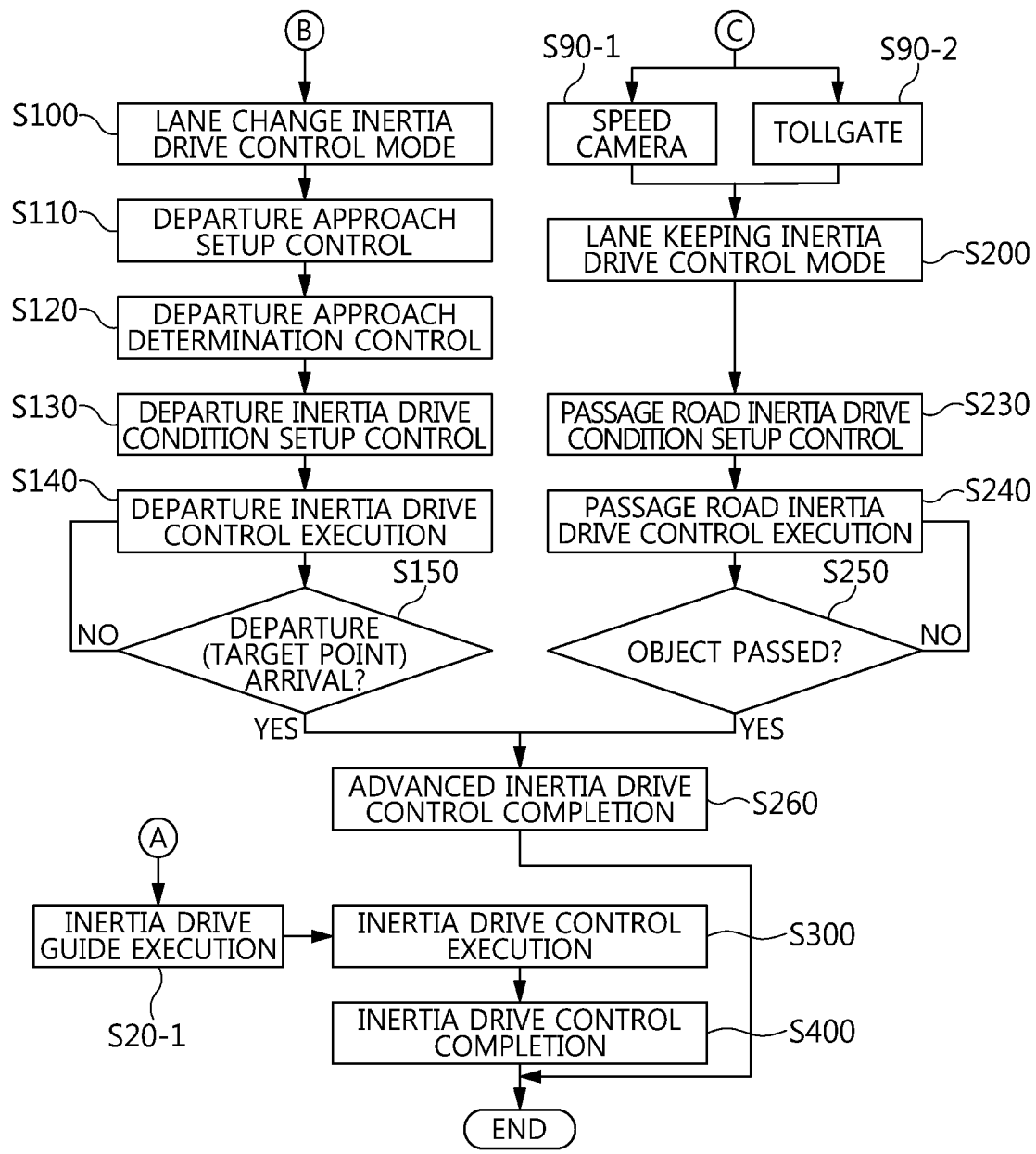
FIG. 2 is a flowchart illustrating a method for advanced inertia drive control according to an exemplary embodiment of the present disclosure that is continued from FIG. 1.

Referring to FIGS. 1 and 2, an inertia drive control method performs road type division control (S10 to S30) in accordance with an event occurrence (e.g., speed reduction event) while a vehicle is driven on a road to divide a road into an expressway (or highway) and a road having 2 lanes or less, and applies advanced inertia drive control (S40 to S260) and inertia drive control (S300 to S400) to the expressway (or highway), whereas applies inertia drive control (S300 to S400) to the road having 2 lanes or less to follow inertia drive guide control (S20-1).

In particular, the advanced inertia drive control (S40 to S260) may apply an IC/JC lane change condition by a lane change inertia drive control mode (S100) to solve the departure approach problem, and apply a lane maintenance condition of a speed camera (e.g., video camera, imaging device, or the like) and a tollgate by a lane maintenance inertia drive control mode (S200) to solve the passing road approach problem. As a result, the advanced inertia drive control (S40 to S260) enables road type and lane division through the inertia drive control, and thus, unlike the existing inertia drive, may perform the inertial drive without the drive obstruction influence exerted on vehicles around the self-vehicle.

Figure 3:
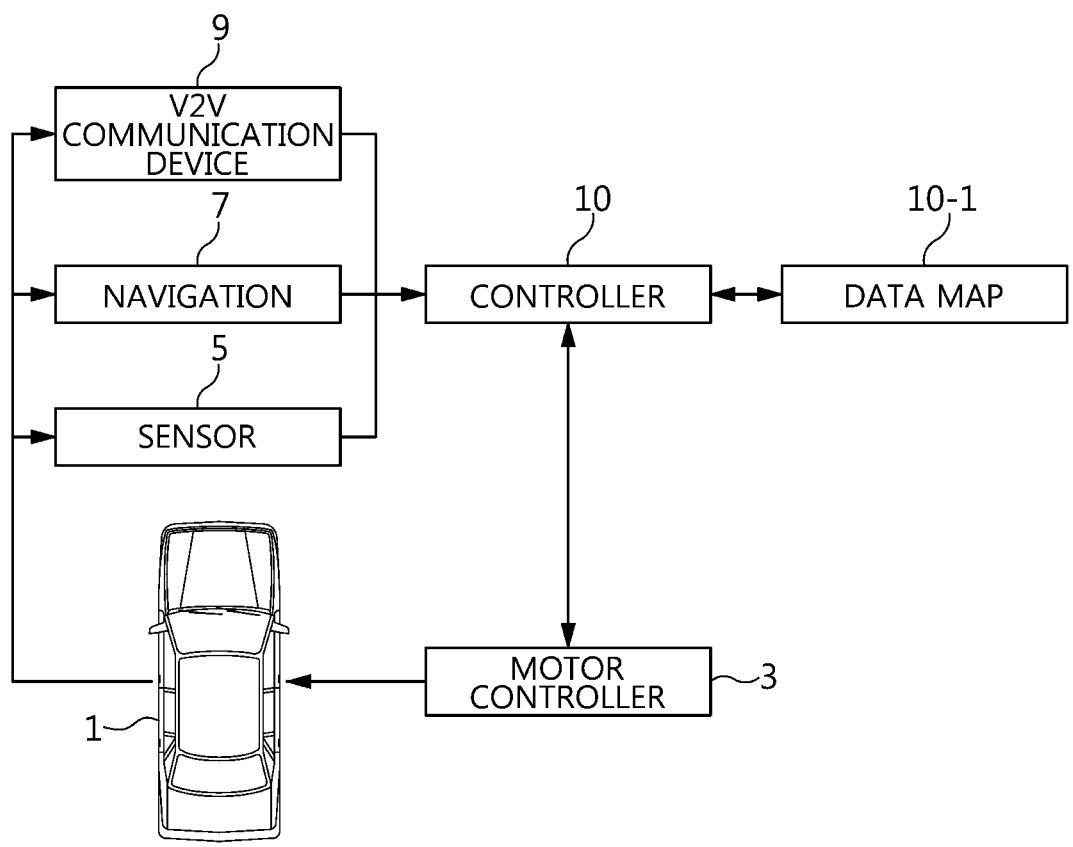
FIG. 3 is a diagram illustrating a vehicle in which advanced inertia drive control is implemented according to an exemplary embodiment of the present disclosure.

Referring to FIG. 3, the vehicle 1 may be an eco-friendly vehicle having a motor as a power source, and may include a braking system composed of an integrated brake assist unit (IBAU) and an active hydraulic booster (AHB), a hybrid control unit (HCU) that is an upper controller for vehicle operation, and a global positioning system (GPS) receiver for satellite reception as a basic specification, and may include a motor controller 3 and a sensor 5, a navigation 7, a V2V communication device 9, and an inertia drive controller 10.

In particular, the inertia drive controller 10 is in association with a motor controller 3 configured to adjust a motor output provided as vehicle drive power as a motor torque, may be provided with detection information of a sensor 5, may be configured to read information of a navigation 7, and perform mutual communication with a V2V communication device 9. As an example, the sensor 5 may include a camera or other type of imaging device configured to confirm a road and a lane using an acquired image, a radar or lidar configured to detect a forward object and inter-vehicle distance, an ultrasonic sensor configured to detect the forward object, and a vehicle speed sensor configured to detect a vehicle speed.

The navigation 7 may be configured to set a driving path together with a vehicle drive guide as road topographical information that divides a speed limit for each road, an IC/JC/tollgate, and vehicle drive change of a topographical change/left/right turn as events, and may be configured to provide a notification regarding overspeed control camera information. The vehicle-to-vehicle (V2V) communication device 9 may be a V2X configured to provide information through wired/wireless network around the vehicle to improve vehicle and road information environment, stability, and convenience, and may include vehicle to vehicle (V2V) for acquiring information of a preceding vehicle via inter-vehicle wireless communication, vehicle to infrastructure (V2I) for performing wireless communication between a vehicle and an infrastructure, in-vehicle networking (IVN) for performing intra-vehicle wired/wireless networking, and vehicle to pedestrian (V2P) for performing communication between a vehicle and a mobile terminal.

Additionally, the inertia drive controller 10 may include a data map 10-1 having three-dimensional (3D) map data based on a map database, and may implement advanced inertia drive control using a discriminatory inertia drive guide function based on the current drive lane and neighbor vehicle behavior through determination of road types for dividing types of lanes and target points. Accordingly, the inertia drive controller 10 may include a torque calculation unit configured to calculate a speed reduction torque for current vehicle speed, target vehicle speed, start point, switching point, and target point, respectively, applied to the advanced inertia drive control, an energy calculation unit configured to calculate motor charge power limit, motor speed reductive torque, motor speed reduction torque, and actual motor torque, and an output unit configured to output a calculation control amount.

Further, the method for inertia drive control may apply the following definition. Although a control factor applied to the advanced inertia drive control (S30 to S260) may be set as a set value or may be derived as the result of mapping the value, the set value or mapping process may differ based on specifications of a vehicle and each device and optimization that matches a vehicle drive condition, and thus are not limited to a specific value.

The target vehicle speed may be a vehicle speed predetermined for each type of speed reduction events rather than a road condition, such as road inclination, and thus it may be a speed limit of a speed limit road, a regulation speed of a crossroad, or a regulation speed of a curved road having a road curvature. The start point, switching point, and target point may be divided as distances on x-axis coordinates, and the target vehicle speed, current vehicle speed, and expected vehicle speed may be divided as vehicle speeds on y-axis coordinates. When the target point is determined as 0 m point from the navigation, the start point may be calculated as a specific distance from the target point, and the switching point may be positioned between the start point and the target point through mapping based on the target vehicle speed. Further, the target vehicle speed may be determined using the mapping of the predetermined vehicle speed for each type of speed reduction events, the current vehicle speed may be set as the current vehicle speed when passing through the start point to be converged to the target vehicle speed, and the expected vehicle speed may be reduced to match the switching point.

The speed reduction event refers to a place where vehicle speed reduction is required when a vehicle is located in front of the self-vehicle in a vehicle-driving road (e.g., a surrounding vehicle is traveling ahead of the subject vehicle). As an example, the speed reduction event may be a speed limit road of which the speed limit has been determined, a crossroad, a curved road, or an interchange (IC)/junction (JC), and in addition, may be a place where a signal lamp or a tollgate is positioned, or a position where U-turn, left turn, or right turn should be performed on a drive path toward a destination set in the navigation device, or a place of arrival (destination) at which the vehicle should be stopped. However, this is merely exemplary, and the present disclosure is not limited thereto. Any place where target vehicle speed is determined and vehicle speed reduction is required may be included in the speed reduction event.

Hereinafter, the method for inertia drive control of FIGS. 1 and 2 will be described in detail with reference to FIGS. 3 to 9. In particular, the control subject is an inertia drive controller 10 associated with a motor controller 3, and the control target is a vehicle 1 including a motor as a power source. Although a control factor applied to the advanced inertia drive control (S30 to S260) of the method for inertia drive control may be set as a set value or may be derived as the result of mapping the value, the set value or the mapping process may differ based on the specifications of the vehicle and each device and optimization that matches the vehicle drive condition, and thus are not limited to a specific value.

The inertia drive controller 10 may be configured to execute the road type division control (S10 to S30) including speed reduction event generation determination (S1), road type division (S10), confirmation of a road having 2 lanes or less (S20), and confirmation of an expressway (or highway) (S30). Referring to FIG. 3, the inertia drive controller 10 may be configured to detect event occurrence including speed limit, IC/JC/speed camera/tollgate, and left/right turn from event information (e.g., speed reduction event) of the navigation 7 based on driving of the vehicle 1.

Further, the inertia drive controller 10 may be configured to detect the vehicle speed using a vehicle speed sensor of a sensor 5, divide road types of the road having 2 lanes or less, expressway, and highway from the lane and road information detected by any one of a camera, radar, lidar, and ultrasonic sensor, and acquire information environments for the vehicle and road through a wired/wireless network around the vehicle 1 via the V2V communication device 9. In particular, the inertia drive controller 10 may be configured to distinguish between the expressway or highway from the current road using a sign of a road for motor vehicles only of a road sign board acquired from GPS and navigation information or camera images.

As a result, when the speed reduction event (S1) occurs in the road (S20) having 2 lanes or less, the inertia drive controller 10 may be configured to execute inertia drive control (S300 to S400) after inertia drive guide control (S20-1). In contrast, when the speed reduction event (S1) occurs in the expressway or highway (S30), the inertia drive controller 10 may be configured to execute advanced inertia drive control (S40 to S260).

Then, the inertia drive controller 10 may be configured to execute the advanced inertia drive control (S40 to S260) including advanced inertia drive control switching (S40), total lane number determination (S50), drive lane division (S60), speed reduction event re-division (S70), lane change inertia drive control mode execution (S100), lane maintenance inertia drive control mode execution (S200), and advanced inertia drive control completion (S260). As an example, the total lane number determination (S50) may be performed through any one of lane information of the navigation 7, lane information of a camera of the sensor 5, road and lane information of the V2V communication device 9, and may divide the total number of lanes into first to third lanes or more with respect to the current driving road having 2 lanes or more.

The driving road division (S60) may divide the driving road into the second lane (S60-1), the first lane (passing lane) (S60-2), and the third lane (S60-3), and set the second lane (S60-1), the first lane (passing lane) (S60-2), and the third lane (S60-3) to lane factor 0, lane factor 1, and lane factor 2, respectively. Accordingly, the driving road division (S60) may divide the driving road into 4 lanes or more, and may set the fourth lane and the fifth lane to lane factor 3 and lane factor 4, respectively. In particular, passing lane determination, middle lane determination, and uppermost/lowermost lane determination may be described in detail as follows.

The passing lane determination may be performed using lane information extraction, lane information utilization, and neighbor vehicle information utilization. The lane information extraction may be performed by a GPS or high-precision GPS to confirm whether the current road is an expressway, how many lanes the road has in total, and whether the current lane is a passing lane. The lane information utilization may be performed to determine that the current lane is a passing lane when the left lane is in a solid line and the right lane is in a dotted or dashed line (in countries with right-hand traffic, determination is performed in a reverse manner). The neighbor vehicle information utilization may be performed to determine the lane extraction through forward left/right vehicle detection using a camera based on the lanes of the current road (in countries with right-hand traffic, determination is performed in a reverse manner), but such extraction is time consuming.

The middle lane determination may be performed using lane information extraction, lane information utilization, and neighbor vehicle information utilization. The lane information extraction may be performed by a GPS or high-precision GPS to confirm whether the current road is an expressway, how many lanes the road has in total, and whether the current lane is a middle lane. The lane information utilization may be performed to determine that the current lane is a middle lane when the left/right lane is in a dotted or dashed line. The neighbor vehicle information utilization may be performed to determine the lane extraction using forward left/right vehicle confirmation using a camera based on the lanes of the current road (in countries with right-hand traffic, determination is performed in a reverse manner), but such extraction is time consuming.

The uppermost/lowermost lane determination may be performed using lane information extraction, lane information utilization, and neighbor vehicle information utilization. The lane information extraction may be performed by a GPS or high-precision GPS to confirm whether the current road is an expressway, how many lanes the road has in total, and whether the current lane is an uppermost/lowermost lane. The lane information utilization may be performed to determine that the current lane is an uppermost lane when the left lane is in a solid line and the right lane is in a dotted or dashed line and that the current lane is a lowermost lane when the right lane is in a solid line and the left lane is in a dotted or dashed line. The neighbor vehicle information utilization may be performed to determine the lane extraction using forward left/right vehicle confirmation using a camera based on the lanes of the current road (in countries with right-hand traffic, determination is performed in a reverse manner), but such extraction is time consuming.

As an example, the speed reduction event division (S70) may be performed using information regarding the IC, JC, speed camera, and tollgate of the navigation 7 or road information of the V2V communication device 9, and the speed reduction event may be divided into a lane change speed reduction condition (S80) and a lane maintenance speed reduction condition (S90). The lane change speed reduction condition (S80) may be applied to the IC/JC. The lane maintenance speed reduction condition (S90) may be applied to the speed camera/tollgate, and for this, may be divided into the speed camera (S90-1) and the tollgate (S90-2).

Additionally, the lane change inertia drive control mode (S100) may be performed through departure approach setup control (S110), departure approach determination control (S120), departure inertia drive condition setup control (S130), departure inertia drive control (S140), and departure (target point) arrival (S150), and as a result, in the lane change inertia drive control mode (S100), the departure approach improvement in accordance with the IC/JC lane change condition may be achieved. Accordingly, the advanced inertia drive control completion (S260) refers to a completion of the departure approach.

Figure 4:
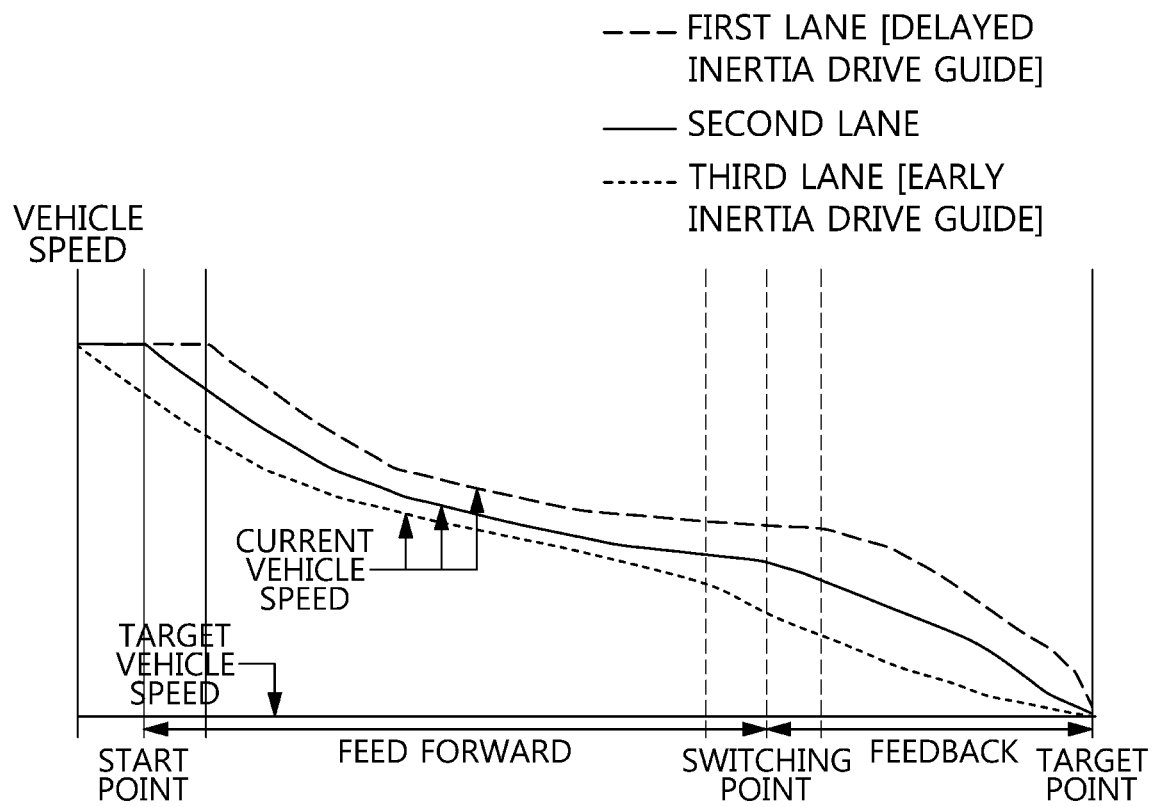
FIG. 4 is a vehicle speed-distance diagram in which the drive lane division concept is exemplified according to an exemplary embodiment of the present disclosure.

Referring to FIG. 4, the inertia drive controller 10 may be configured to detect that a rear vehicle is in a passing lane or uppermost lane and is traveling at a high speed (e.g., greater than a predetermined speed limit) in the lane change inertia drive control mode (S100). Accordingly, the inertia drive controller 10 may be configured to apply as a control concept delayed inertia drive guide in the first lane and early inertia drive guide in the third lane or less based on the second lane.

Additionally, the lane maintenance inertia drive control mode (S200) may be performed through passage road inertia drive condition setup control (S230), passage road inertia drive control execution (S240), and object passage (S250), and as a result, in the lane maintenance inertia drive control mode (S200), the passage road approach improvement in accordance with the lane maintenance condition of the speed camera and the tollgate may be achieved. Accordingly, the advanced inertia drive control completion (S260) refers to the speed camera or the tollgate has passed.

Referring to FIG. 4, the inertia drive controller 10 may be configured to detect that an overspeeding control target vehicle that passes through the speed camera or tollgate continues to be driven within the subject vehicle driving lane (i.e., driving lane) during the inertia driving due to the speed camera, mostly reduces speed, and then reaccelerates in the lane maintenance inertia drive control mode (S200). Accordingly, the inertia drive controller 10 may be configured to apply as a control concept own lane maintenance without applying the lane change guide while maintaining non-existence of an excessive speed reduction or too early start point to prevent any inconvenience to a driver feeling.

In contrast, in the existing inertia drive control situation, the inertia drive controller 10 may be configured to execute the inertia drive guide control (S20-1), execute the inertial drive control (S300), and then complete the inertial drive control (S400). Particularly, the inertia drive control end or non-approach refers to when the inertia drive guide and also the inertia drive control including feed forward control and feedback control is not performed even when the driver disengages an accelerator pedal.

Figure 5:
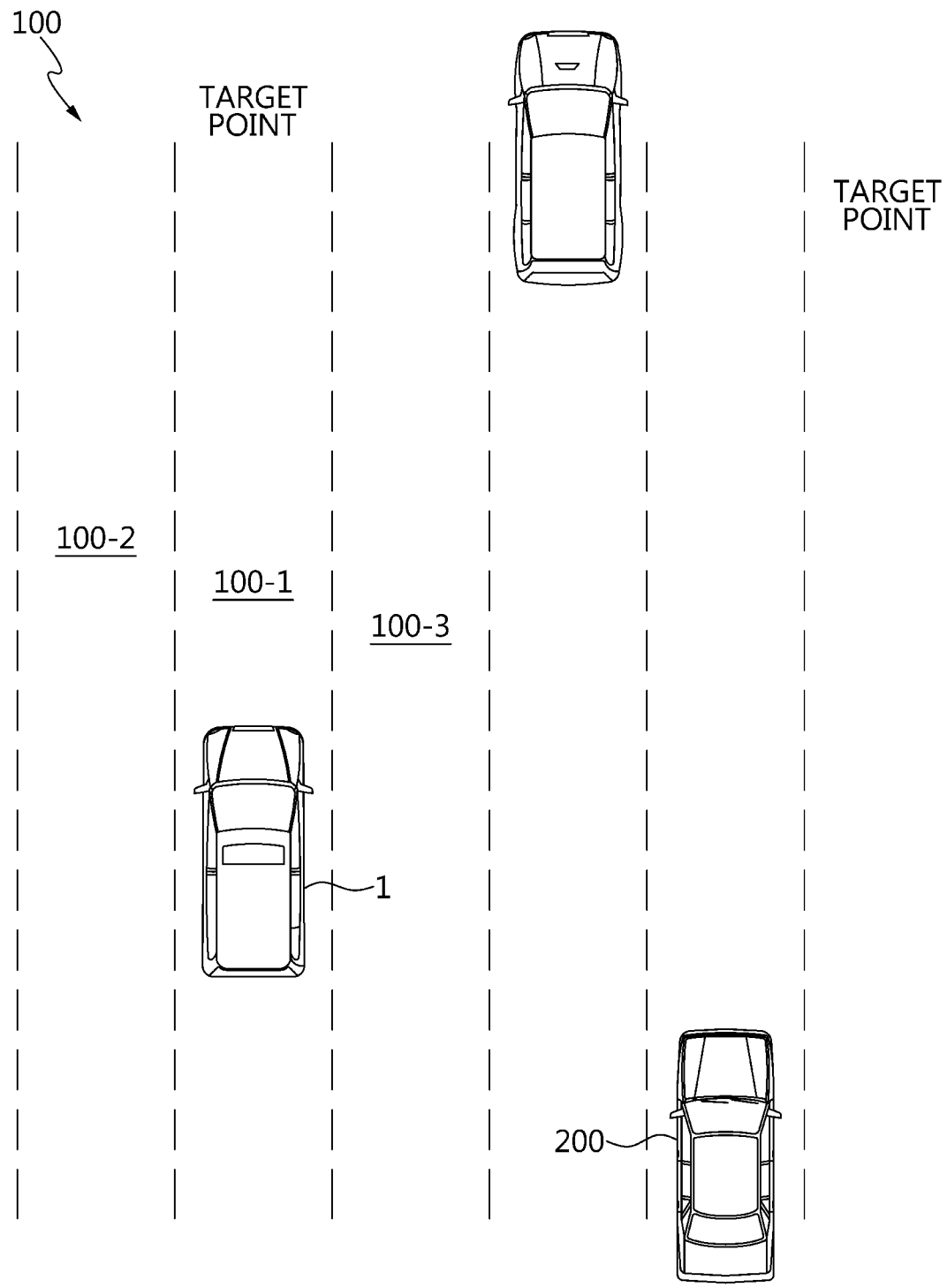
FIG. 5 is a diagram illustrating a lane change speed reduction condition according to an exemplary embodiment of the present disclosure.
Figure 6:
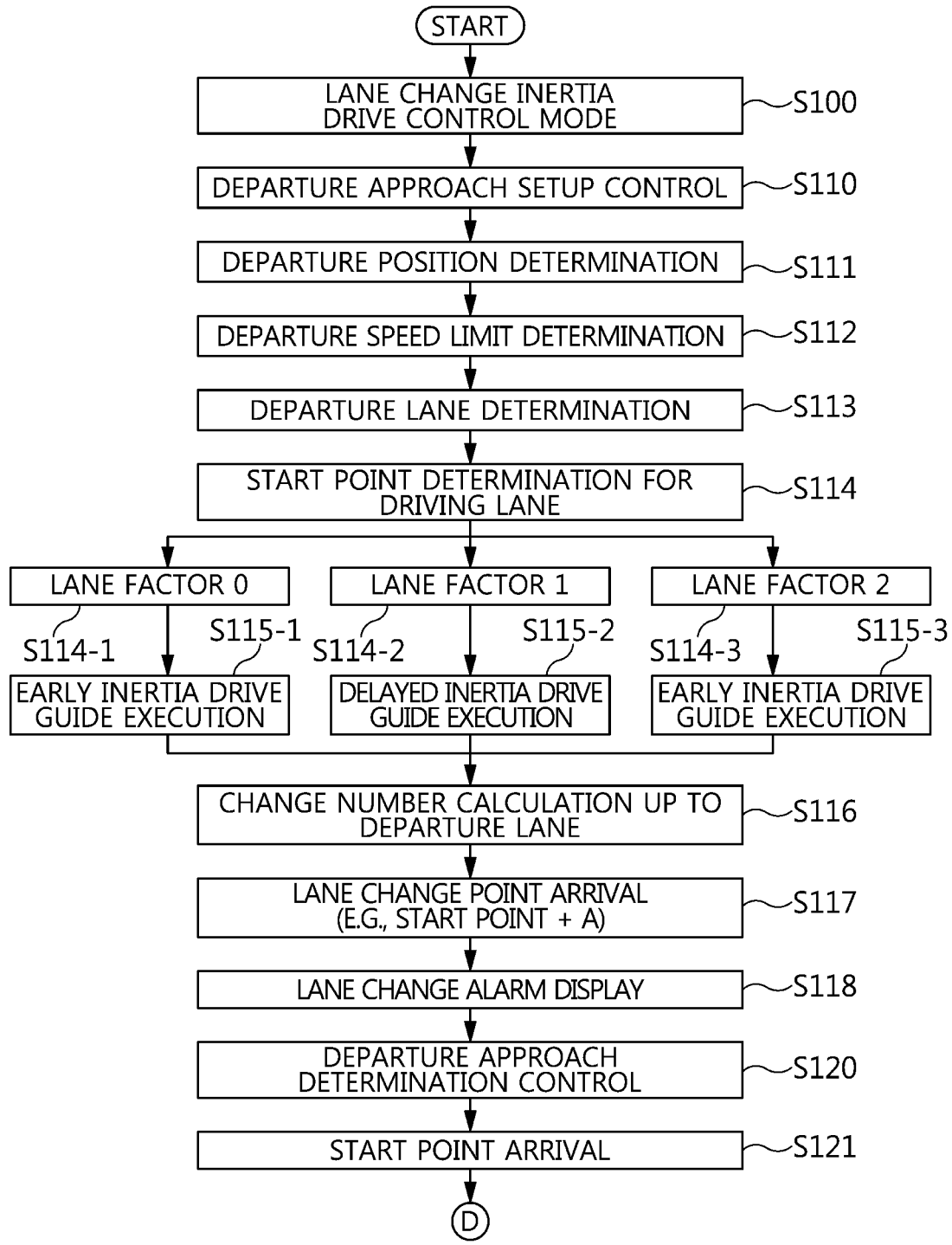
FIG. 6 is a detailed flowchart illustrating a lane change inertia drive control mode according to an exemplary embodiment of the present disclosure.
Figure 7:
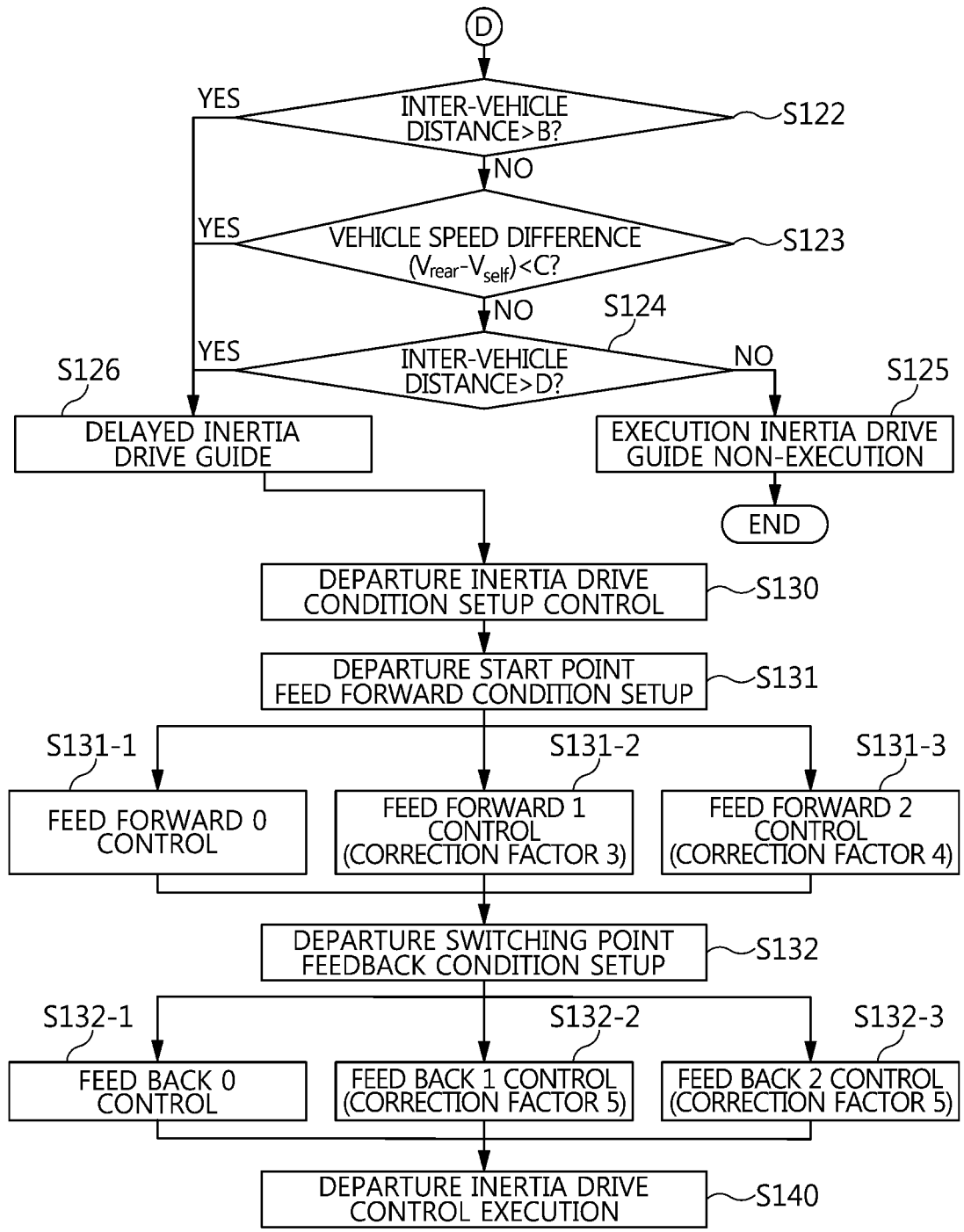
FIG. 7 is a detailed flowchart illustrating a lane change inertia drive control mode according to an exemplary embodiment of the present disclosure that is continued from FIG. 6.

Furthermore, FIGS. 5 to 7 illustrate a state where a departure of a vehicle 1 is performed in a lane change inertia drive control mode (S100). Referring to FIG. 5, it may be assumed that a road in which a vehicle 1 travels has a first lane 100-2, a second lane 100-1, and a third lane 100-3, the rightmost lane is a target point that is an IC or JC departure lane, and a following vehicle 200 travels in the IC or JC departure lane. Accordingly, when the vehicle 1 intends to approach the IC or JC departure lane, the inertia drive controller 10 may be configured to execute the inertial drive control mode (S100), and thus the drive obstruction influence that the vehicle 1 exerts on the following vehicle 200 may be minimized or removed.

Referring to FIGS. 6 and 7, the inertia drive controller 10 may be configured to execute the lane change inertial drive control mode (S100) through departure approach setup control (S110), departure approach determination control (S120), departure inertial drive condition setup control (S130), and departure inertia drive control (S140). Specifically, the departure approach setup control (S110) may be performed through departure position determination (S111), departure speed limit determination (S112), departure lane determination (S113), start point determination for each driving lane (S114), inertia drive guide division (S115-1 to S115-3), change number calculation up to the departure lane (S116), lane change point arrival confirmation (S117), and lane change alarm display (S118).

As an example, the departure position determination (S111), the departure speed limit determination (S112), and the departure lane determination (S113) may be performed through information of the navigation 7 or the V2V communication device 9. The start point determination (S114) for each driving lane may be divided into lane factor 0 (S114-1), lane factor 1 (S114-2), and lane factor 2 (S114-3), and the lane factor 0 (S114-1), lane factor 1 (S114-2), and lane factor 2 (S114-3) may be based on the second lane (S60-1), the first lane (passing lane) (S60-2), and the third lane (S60-3) confirmed through the driving lane division (S60).

Additionally, the inertia drive guide division (S115-1 to S115-3) may be divided into early inertia drive guide execution (S115-1), delayed inertia drive guide execution (S115-2), and early inertia drive guide execution (S115-3). Since the early inertia drive guide execution (S115-1) is based on lane factor 0 (S114-1), it may be performed in the second lane (reference lane), and since the delayed inertia drive guide execution (S115-2) is based on lane factor 1 (S114-2), it may be performed in the first lane (passing lane). Further, since the early inertia drive guide execution (S115-3) is based on lane factor 2 (S114-3), it may be performed in the third lane or less. The change number calculation (S116) up to the departure road may be performed to match respective cases of the early inertia drive guide execution (S115-1) reflecting the current drive lane, the delayed inertia drive guide execution (S115-2), and the early inertia drive guide execution (S115-3).

The lane change point arrival confirmation (S116) may apply the following lane change point determination equation. Lane change point determination equation: Start point+A
wherein, "A" denotes a start point compensation factor, and the start point compensation factor A of the second lane (reference lane) according to the early inertia drive guide execution (S115-1) of lane factor 0 (S114-1) is applied as "1".

Further, the start point compensation factor A of the first lane (passing lane) according to the delayed inertia drive guide execution (S115-2) of lane factor 1 (S114-2) may be applied as "0.95", and the start point compensation factor A of the third lane or less according to the early inertia drive guide execution (S115-3) of lane factor 2 (S114-3) may be applied as "1.1". In particular, it may be possible to map the start point compensation factor A to a different value.

Accordingly, as for the start point compensation factor A, when the second lane is set as the reference lane, the start time may be reduced in the delayed inertia drive guide execution (S115-2) of the first lane (passing lane), and the start time may be increased in the early inertia drive guide execution (S115-3) of the third lane or less. The lane change alarm display (S118) may be configured to guide driver's inertia drive operation by notifying the driver of the inertial drive guide selected among the early inertia drive guide execution (S115-1), the delayed inertia drive guide execution (S115-2), and the early inertia drive guide execution (S115-3) during the lane change point arrival confirmation (S116).

In particular, the lane change alarm may be displayed using a cluster indicator, a display device of an AVN (Audio, Video, and Navigation) device, a head-up display (HUD), or other in-vehicle display devices. Further, the departure approach determination control (S120) may be performed through start point arrival confirmation (S121), initial inter-vehicle distance determination (S122), vehicle speed difference determination (S123), final inter-vehicle distance determination (S124), inertia drive guide non-execution (S125), and delayed inertia drive guide (S126).

As an example, the start point arrival (S121) refers to a start point to which the start point compensation factor A based on the inertia drive guide selected among the early inertia drive guide execution (S115-1), the delayed inertia drive guide execution (S115-2), and the early inertia drive guide execution (S115-3) is applied. The initial inter-vehicle distance determination (S122), the vehicle speed difference determination (S123), and the final inter-vehicle distance determination (S124) apply the following determination equations:

Initial inter-vehicle distance determination equation: Initial inter-vehicle distance>B Vehicle speed difference determination equation: Vehicle speed difference $(V_{rear}-V_{self})<C$ Final inter-vehicle determination equation: Final inter-vehicle distance>D wherein, "initial/final inter-vehicle distance" is a separation distance between the vehicle 100 and the rear vehicle 200 acquired from the ultrasonic sensor, radar/lidar, or V2V communication device 9, and "vehicle speed difference" is a speed difference obtained by subtracting the vehicle speed $V_{self}$ of the vehicle (i.e., self-vehicle) 1 from the vehicle speed $V_{rear}$ of the rear vehicle 200 acquired from the ultrasonic sensor, radar/lidar, or V2V communication device 9. Further, "B", "C", and "D" are threshold values applied to the initial/final inter-vehicle distance and the vehicle speed difference, respectively, and "<" and ">" are signs of inequality representing sizes of two values.

In particular, the initial inter-vehicle distance threshold value B, the vehicle speed difference threshold value C, and the final inter-vehicle distance threshold value D are dependent on the vehicle speeds of the vehicle 1 and the rear vehicle 200. However, since the vehicle speeds at the determination time differ from each other, the inter-vehicle distance and the speed difference requiring typical speed reduction, rather than being limited to specific values, may be applied. As a result, when the initial inter-vehicle distance is less than the initial inter-vehicle distance threshold value B, the vehicle speed difference value is less than the vehicle speed difference threshold value C, or the final inter-vehicle distance value is less than the final inter-vehicle distance threshold value D, the departure approach intention of the vehicle 1 does not disturb the driving of the rear vehicle 200, and thus the inertia drive controller 10 may be switched to the inertial drive guide non-execution (S125) to terminate the inertia drive control.

In contrast, when the initial inter-vehicle distance is equal to or greater than the initial inter-vehicle distance threshold value B, when the initial inter-vehicle distance is less than the initial inter-vehicle distance threshold value B, and the vehicle speed difference value is equal to or greater than the vehicle speed difference threshold value C, or when the initial inter-vehicle distance is less than the initial inter-vehicle distance threshold value B, the vehicle speed difference value is less than the vehicle speed difference threshold value C, and the final inter-vehicle distance value is equal to or greater than the final inter-vehicle distance threshold value D, the inertia drive controller 10 may be configured to execute the delayed inertia drive guide (S126). After the delayed inertia drive guide (S126), the inertial drive controller 10 may enter into the departure inertia drive condition setup control (S130).

Specifically, the departure inertia drive condition setup control (S130 may be is performed through departure start point feed forward condition setup (S131), and departure switching point feedback condition setup (S132). In consideration of the second lane as the reference lane, the first lane (passing lane) applies a reduced start time, and the lane having 3 lanes or less applies an increased start time in the same manner as the start point compensation factor A application of the lane change point arrival confirmation (S116). In consideration of the second lane as the reference lane, compared to the second lane switching point, the switching point is set to ① First lane (passing lane) switching point=Second lane switching point−(Second lane start point−First lane start point), and ② Third lane (or less) switching point=Second lane switching point−(Second lane start point−Third lane start point).

As an example, the departure start point feed forward condition setup (S131) may be divided into feed forward 0 control (S131-1), feed forward 1 control (correction factor 3) (S131-2), and feed forward 2 control (correction factor 4) (S131-3). The departure feed forward correction factor is a correction value for the feed forward 0 control (S131-1) applied to the second lane that is the reference lane, and under the assumption that the correction factor of the feed forward 0 control (S131-1) is "1", the correction factor 3 of the feed forward 1 control (S131-2) applies "0.95" that is less than "1", and the correction factor 4 of the feed forward 2 control (S131-3) applies "1.1" that is greater than "1". In particular, the correction factor 3 and the correction factor 4 may be mapped to different values. Accordingly, based on the feed forward 0 control (S131-1), the feed forward value may be reduced in the first lane (passing lane) feed forward 1 control (S131-2), and the feed forward value may be increased in the third lane (or less) feed forward 2 control (S131-3).

Referring to FIG. 4, the feed forward control of the lane change inertia drive control mode (S100) starts when the driver disengages the acceleration pedal and the vehicle 1 arrives at the start point to be kept up to the switching point, and the inertia drive motor torque applied to the motor during the feed forward control may be determined as a value obtained by adding an additional torque determined in accordance with the current position information and the target vehicle speed of the vehicle to the basic creep torque. Accordingly, the feed forward control generates vehicle speed reduction feeling in a manner that the inertia drive motor torque obtained by adding the additional torque to the basic creep torque is applied to the motor, and in this case, since both the basic creep torque and the additional torque are negative torques (motor regenerative torques), battery charging may be performed through an electric generation operation of the motor.

As an example, the departure switching point feedback condition setup (S132) may be divided into feedback 0 control (S132-1), feedback 1 control (correction factor 5) (S132-2), and feedback 2 control (correction factor 5) (S132-3). The departure feedback correction factor is a correction value for the feedback 0 control (S132-1) applied to the second lane that is the reference lane, and the correction factor of the feedback 0 control (S132-1) and the correction factor 5 of the feedback 1 control (S132-2) and the feedback 2 control (S132-3) apply the same values since even when the feedback values of other lanes are set to be the same, the feedback times for lanes differ from each other, and thus the target speed may be naturally followed.

However, the correction factor 5 of the feedback 1 control (S132-2) and the feedback 2 control (S132-3) may apply "0.95" that is less than "1" or "1.1" that is greater than "1", or may apply another value to match the number of lanes. Accordingly, the feedback 0 control (S132-1), the feedback 1 control (S132-2), and the feedback 2 control (S132-3) perform the control to follow the target speed.

Referring to FIG. 4, the feedback control of the lane change inertia drive control mode (S100) may be switched from the feed forward control when the vehicle 1 arrives at the switching point to be kept up to the target point, and during the feedback control, the vehicle speed control may be performed to reach the target vehicle speed at the target point using the difference between the target vehicle speed and the adjusted vehicle speed (e.g., current vehicle speed during the control) and the distance between the target position and the current position (e.g., vehicle position during the control).

Additionally, the departure inertia drive control (S140) is the control for the vehicle 1 to travel away from the road 100 of the first to third lanes 100-2, 100-1, and 100-3 toward the IC or JC departure when the vehicle 1 does not disturb the driving of the rear vehicle 200 as the inertia drive controller 10 performs the advanced inertia drive control.

Figure 8:
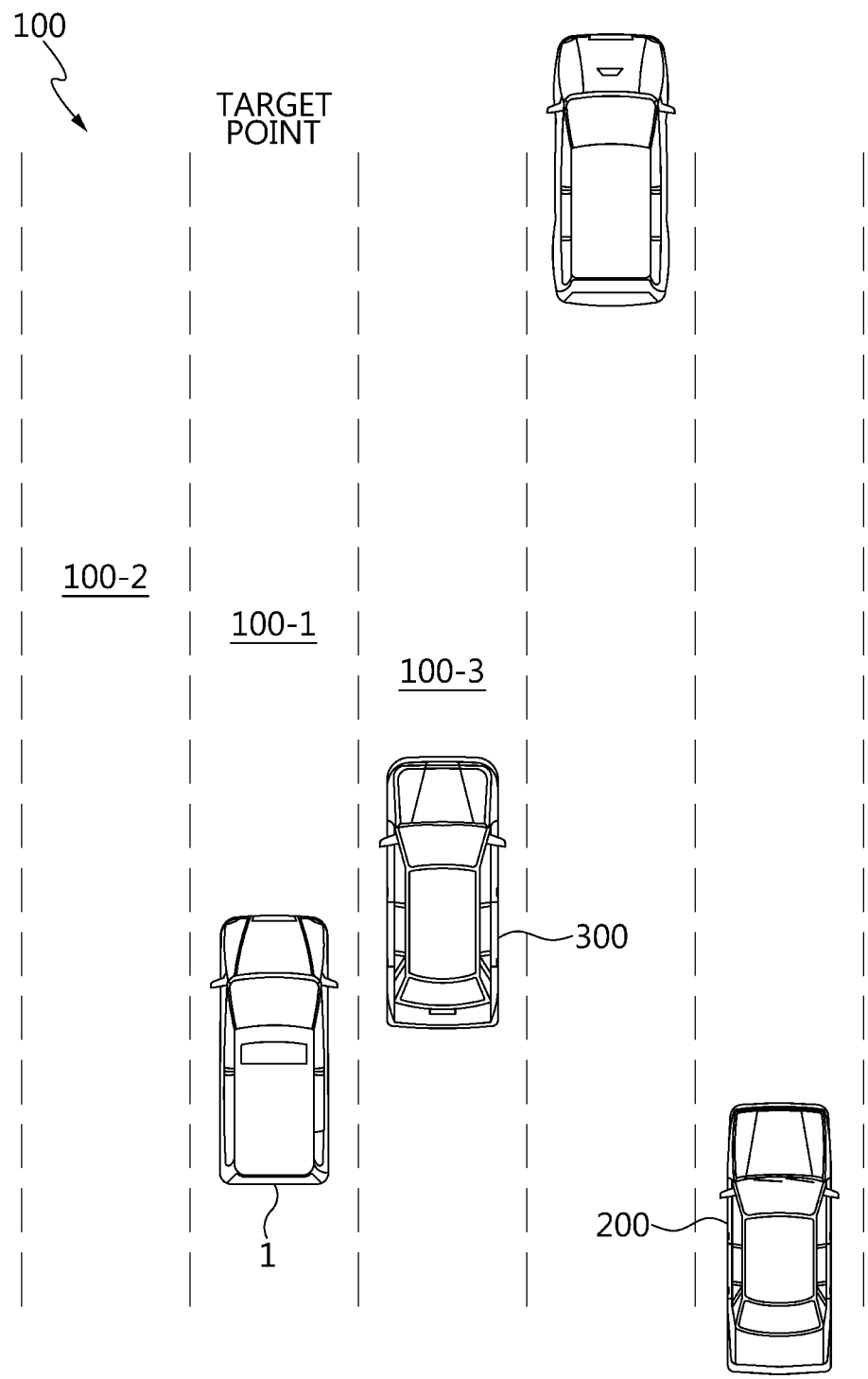
FIG. 8 is a diagram illustrating an example of a lane maintenance speed reduction condition according to an exemplary embodiment of the present disclosure.
Figure 9:
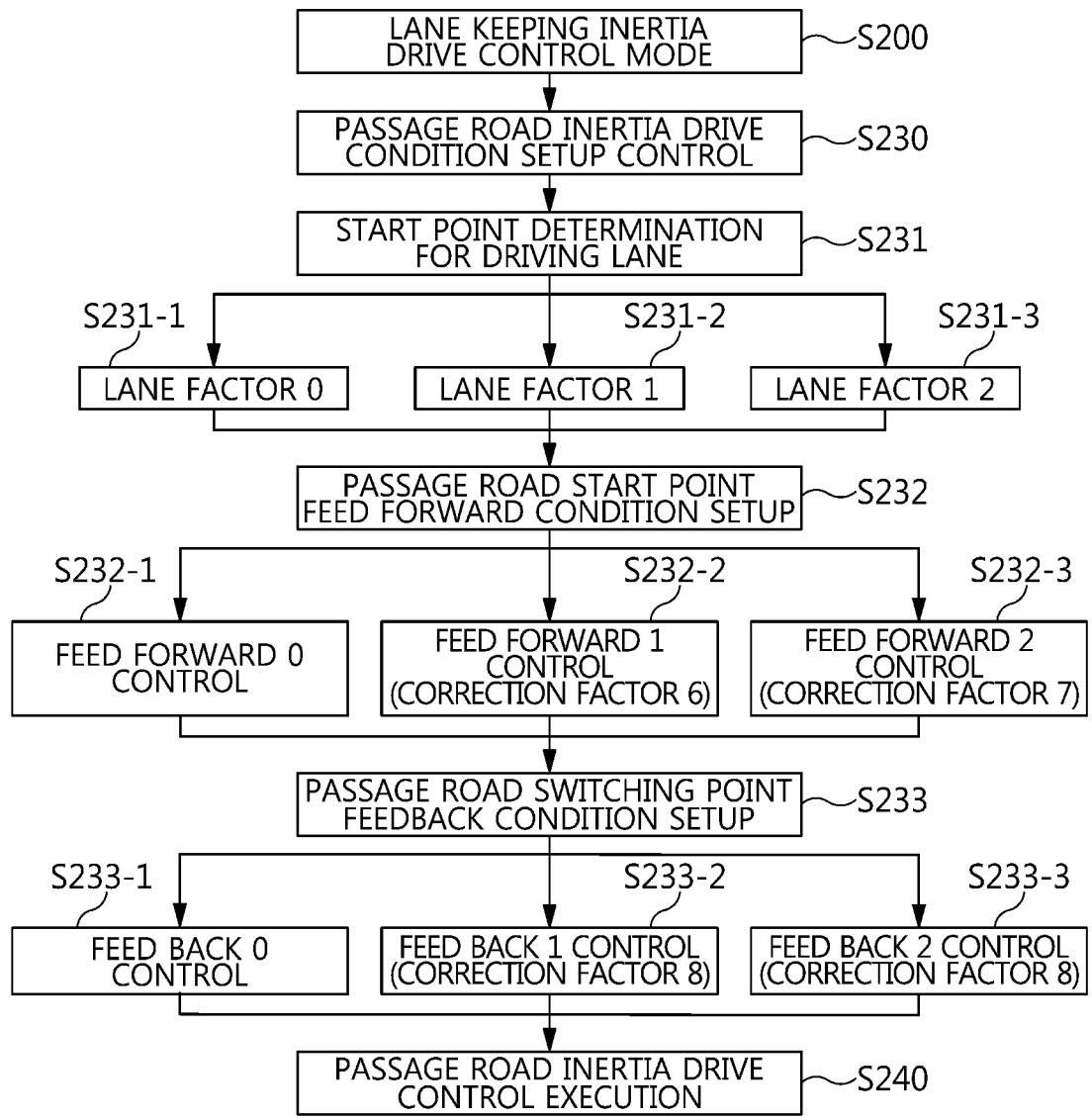
FIG. 9 is a detailed flowchart explaining a lane maintenance inertia drive control mode according to an exemplary embodiment of the present disclosure.

FIGS. 8 and 9 illustrate a state where a vehicle 1 passes through a speed camera/tollgate in a lane inertia drive control mode (S200). Referring to FIG. 8, it may be assumed that the vehicle 1 passes through a monitoring camera or a tollgate using the second lane 100-1 of the road 100. Accordingly, when the vehicle 1 intends to pass through the monitoring camera or tollgate, the inertia drive controller 10 may be configured to execute the lane maintenance inertia drive control mode (S200), and thus the drive obstruction influence that the vehicle 1 exerts on a rear vehicle 200 or a neighbor vehicle 300 may be minimized or removed.

Referring to FIG. 9, the lane maintenance inertia drive control mode (S200) may be performed through passage road inertia drive condition setup control (S230) and passage road inertia drive condition setup control (S240). Specifically, the passage road inertia drive condition setup control (S230) may be performed through start point determination for each driving lane (S231), passage road start point feed forward condition setup (S232), and passage road switching point feedback condition setup (S233).

As an example, the start point determination (S231114) for each driving lane may be divided into lane factor 0 (S231-1), lane factor 1 (S231-2), and lane factor 2 (S231-3). The lane factor 0 (S231-1), lane factor 1 (S231-2), and lane factor 2 (S231-3) may be based on the second lane, the first lane (passing lane), and the third lane, and may be the same as the lane factor 0 (S114-1), lane factor 1 (S114-2), and lane factor 2 (S114-3) of the start point determination (S114) for each driving lane. The passage road start point feed forward condition setup (S232) may be divided into feed forward 0 control (S232-1), feed forward 1 control (correction factor 6) (S232-2), and feed forward 2 control (correction factor 7) (S232-3).

The passage road feed forward correction factor is a correction value for feed forward 0 control (S231-1) applied to the second lane that is the basic lane, correction factor 6 of the feed forward 1 control (S231-2) applied to the first lane (passing lane) based on the correction factor 1 of the feed forward 0 control (S231-1) applies "0.95" that is less than "1", and the correction factor 7 of the feed forward 2 control (S231-3) applied to the third lane or less applies "1.1" that is greater than "1". In particular, it may be possible to map the correction factor 6 and the correction factor 7 to different values so that the start point does not exist too early.

Based on the feed forward 0 control (S231-1), the feed forward value may be reduced in the first lane (passing lane) feed forward 1 control (S231-2), and the feed forward value may be increased in the third lane (or less) feed forward 2 control (S231-3). Accordingly, the feed forward control of the lane maintenance inertia drive control mode (S200) is similar to the feed forward control of the lane change inertia drive control mode (S100), but is different from the feed forward control of the lane change inertia drive control mode (S100) since the control may be performed to prevent the start point from being reached too early.

As an example, the passage road switching point feedback condition setup (S233) may be divided into feedback 0 control (S233-1), feedback 1 control (correction factor 8) (S233-2), and feedback 2 control (correction factor 8) (S233-3). The passage road feedback correction factor is a correction value for the feedback 0 control (S233-1) applied to the second lane that is the reference lane, and the correction factor of the feedback 0 control (S233-1) and the correction factor 8 of the feedback 1 control (S233-2) and the feedback 2 control (S233-3) apply the same values since even when the feedback values of other lanes are set to be the same, the feedback times for lanes differ from each other, and thus the target speed may be followed.

However, based on the correction factor "1" of the feedback 0 control (S132-1), the correction factor 5 of the feedback 1 control (S132-2) and the feedback 2 control (S132-3) may apply "0.95" that is less than "1" or "1.1" that is greater than "1", or may apply another value to match the number of lanes. In particular, the correction factor 8 of the feedback 1 control (S233-2), and the feedback 2 control (S233-3) may be set to avoid an excessive speed reduction that causes the driver to feel inconvenience in case of the speed camera that the driver faces in an overspeeding state of the vehicle 1 or to avoid too early arrival at the start point. The correction factor 8 may be applied for each lane since the rear vehicle 200 has a high speed in case of a wide road having a passing lane or the uppermost lane in addition to the first to third lanes.

The feedback 0 control (S233-1), the feedback 1 control (S233-2), and the feedback 2 control (S233-3) may perform the control to follow the target speed although the lanes are different from each other. Accordingly, the feedback control of the lane maintenance inertia drive control mode (S200) is similar to the feed forward control of the lane change inertia drive control mode (S100), but is different from the feed forward control of the lane change inertia drive control mode (S100) since the control may be performed to avoid the excessive speed reduction that causes the driver to feel inconvenience.

Particularly, the passage road inertia drive control execution (S240) is the control for the vehicle 1 to pass through the speed camera or tollgate when the vehicle 1 is continuously driven in a same lane (e.g., second lane 100-1) in the road 100 having the first to third lanes 100-2, 100-1, and 100-3 without disturbing or interfering with the driving of the rear vehicle 200 and neighbor vehicle 300 as the inertia drive controller 10 performs the advanced inertia drive control.

As described above, the method for inertia drive control of the vehicle 1 according to this exemplary embodiment may include performing advanced inertia drive control divided into a lane change inertia drive control guide/execution mode that matches a lane change for departure approach of an interchange (IC) or junction (JC) after performing road type and lane division for a road through a speed reduction event detected during road driving, and a lane maintenance inertia drive control guide/execution mode that matches lane maintenance for speed camera/tollgate passing driving.

Accordingly, an inertia drive control region may be extended to a road type of an expressway and a highway having two or more lanes, and particularly, through the advanced inertia drive control, a drive obstruction influence exerted on rear/neighbor vehicles around a self-vehicle may be minimized during IC/JC departure approach and speed camera/tollgate passing driving without giving a driver unpleasant feeling through an excessive speed reduction or early control start.

While the present disclosure has been described with respect to the exemplary embodiments, it will be apparent to those skilled in the art that various changes and modifications may be made without departing from the spirit and scope of the disclosure as defined in the following claims.

What is claimed is:

1. A method for inertia drive control, comprising:
  performing, by an inertia drive controller, advanced inertia drive control by:
    detecting a speed reduction event, a lane division, and a road division during road driving of a vehicle; and
    performing inertia drive control guide and the inertia drive control on drive conditions of lane change and lane maintenance,
  wherein the lane division is detected when a total number of lanes corresponds to multi-lanes,
  wherein the multi-lanes corresponds to a first lane, a second lane, a third lane, and an N-th lane, wherein N is a constant that is equal to or greater than 4,
  wherein the second lane is applied as a reference lane in determining the driving lane, and
  wherein the second lane, by the inertia drive controller, is set as the reference lane, a start time is reduced in a delayed inertia drive guide execution of the first lane, and the start time is increased in an early drive guide execution of the third lane;
  wherein the delayed inertia drive guide execution of the first lane and the early inertia drive guide execution of the third lane are applied according to a start point compensation factor; and
  wherein a value of the start point compensation factor is different for each lane.

2. The method according to claim 1, wherein the lane change is applied to departure approach driving of an interchange (IC) or a junction (JC), and the lane maintenance is applied to speed camera or tollgate passing driving.

3. The method according to claim 1, wherein the speed reduction event is confirmed from navigation information or road information of a vehicle-to-vehicle (V2V) communication device.

4. The method according to claim 1, wherein the advanced inertia drive control includes:
  determining, by the inertia drive controller, a total number of lanes for the lane division by classifying an expressway or a highway in which the speed reduction event has occurred while the vehicle is driving on a road;
  determining, by the inertia drive controller, a driving lane among the total number of lanes;
  when the speed reduction event is divided into, by the inertia drive controller, a lane change speed reduction condition and a lane maintenance speed reduction condition;
  in case of lane change speed reduction condition by the speed reduction event, switching, by the inertia drive controller, to a lane change inertial drive control mode in which departure determination, departure start point determination, lane change point determination, lane change alarm display, departure start point arrival, rear vehicle condition determination, departure start point feed forward condition setting, departure switching point feedback condition setting, and departure inertial drive control are performed; and in case of the lane maintenance speed reduction condition by the speed reduction event, switching, by the inertia drive controller, to a lane maintenance inertia drive control mode in which passage object division, passage road start point determination, passage road start point feed forward condition setting, passage road switching point feedback condition setting, and passage road inertia drive control are performed; and determining, by the inertia drive controller, departure position arrival in the lane change inertia drive control mode and completion of object passage road advanced inertia drive control in the lane maintenance inertia drive control mode.

5. The method according to claim 4, wherein the departure determination is performed by determining a departure position and a departure speed limit from the total number of lanes.

6. The method according to claim 4, wherein the departure start point arrival is performed by differently providing start point compensation factors to a departure start point of the driving lane, and the lane change point determination is performed by confirming a lane change point arrival through the departure start point and calculation of the number of times of lane changes up to a departure road.

7. The method according to claim 6, wherein the lane change point arrival is reduced or increased through application of the start point compensation factor.

8. The method according to claim 4, wherein the rear vehicle condition determination is performed by applying an initial inter-vehicle distance between a subject vehicle and a rear vehicle, a vehicle speed difference, and a final inter-vehicle distance.

9. The method according to claim 8, wherein the initial inter-vehicle distance, the vehicle speed difference, and the final inter-vehicle distance apply threshold values for condition satisfaction, and the threshold values for the condition satisfaction delay a inertia drive guide.

10. The method according to claim 4, wherein the departure start point feed forward condition setting is performed by applying an inertia drive motor torque obtained by adding an additional torque to a basic creep torque to a motor, and the departure switching point feedback condition setting is performed through vehicle speed control for reaching a target vehicle speed at a target point.

11. The method according to claim 10, wherein the departure start point feed forward condition setting is performed by applying a feed forward correction factor that decreases or increases a feed forward value, and the departure switching point feedback condition setting is performed by applying a feedback correction factor that decreases or increases a feedback value.

12. The method according to claim 4, wherein the passage object division is performed by applying a speed camera or a tollgate.

13. The method according to claim 4, wherein the passage road start point feed forward condition setting is performed by applying an inertia drive motor torque obtained by adding an additional torque to a basic creep torque to a motor, and the passage road switching point feedback condition setting is performed through vehicle speed control for reaching a target vehicle speed at a target point.

14. The method according to claim 4, wherein the passage road start point feed forward condition setting is performed by applying a feed forward correction factor that decreases or increases a feed forward value, and the passage road switching point feedback condition setting is performed by applying a feedback correction factor that decreases or increases a feedback value.

15. The method according to claim 1, wherein when the road type is a road having two lanes or less, the inertia drive control is performed until the speed reduction event is released to follow a inertia drive guide.

* * * * *